United States Patent [19]

Green

[11] 3,946,762
[45] Mar. 30, 1976

[54] UNDERGROUND IRRIGATION SYSTEM
[76] Inventor: Edwin J. Green, 10210 Baseline Road, Altaloma, Calif. 91701
[22] Filed: July 29, 1974
[21] Appl. No.: 492,963

[52] U.S. Cl. .................. 138/140; 239/145; 239/542
[51] Int. Cl.² ........................................... F16L 9/18
[58] Field of Search ........... 138/140, 148, 124, 177; 239/145, 542

[56] References Cited
UNITED STATES PATENTS

| | | | |
|---|---|---|---|
| 928,660 | 7/1909 | Ippolito | 239/145 UX |
| 1,989,427 | 1/1935 | Robey | 239/145 |
| 3,698,195 | 10/1972 | Chapin | 239/145 X |
| 3,777,987 | 12/1973 | Aleport | 239/542 |
| 3,830,067 | 8/1974 | Osborn et al. | 239/145 X |
| 3,858,618 | 1/1975 | Kaufman | 138/148 X |

Primary Examiner—Richard C. Queisser
Assistant Examiner—Charles Gorenstein
Attorney, Agent, or Firm—Lyon & Lyon

[57] ABSTRACT

An irrigation or drainage system is provided comprising one or more conduits having radially positioned spaced apertures in the walls thereof, the system being otherwise closed except for an inlet/outlet aperture. The exterior of the conduits is covered by a snugly fitting fine mesh fabric sheath which covers all of the radial apertures, the interstices in the mesh of the fabric being very small and uniformly distributed such that fluid under slight to moderate pressure will flow through said sheath at least partially as the result of capillary action, and fluid distribution will be uniform throughout the length of the fabric sheath and about the periphery thereof.

3 Claims, 3 Drawing Figures

UNDERGROUND IRRIGATION SYSTEM

BACKGROUND OF THE INVENTION

The present invention relates generally to irrigation systems and particularly to a system of fluid conduits to be installed preferably below ground to distribute irrigating liquids in controllable amounts uniformly dispersed along a given length. There have, in the past, been efforts to provide an underground irrigation system but which have not proven satisfactory after prolonged use. If a conduit is provided having apertures in the wall thereof and that conduit is then buried beneath the soil surface, certain problems arise. First of all, in order to obtain a uniform distribution of irrigating liquid, it is necessary to provide rather larger apertures, usually about ⅛ inch in diameter. When such a device is used, and particularly if pressure is not constantly maintained therein, soil particles and salts will gradually work their way into the pipe and build up, eventually clogging the system. Prior systems have failed to disclose a satisfactory method of preventing this difficulty while at the same time providing a uniform fluid flow.

SUMMARY OF THE INVENTION

The present invention provides an improved underground irrigation system in which fluid conduits are formed from material which is resistant to the chemical action of soil salts and irrigating fluids and which is provided with a plurality of radially positioned spaced apertures having sufficient diameter to provide a desirable rate of fluid flow. The exterior of the conduits in the areas where the apertures are provided is covered with a snugly fitting sheath of fabric material of a particular type having a uniform bi-directional weave, the interstices of which are very small such that flow through the fabric sheath is substantially by means of capillary type action. In addition, the material from which the fabric is made is also of a type which will not be affected by direct contact with soil salts, dissolved minerals or any chemicals commonly used for irrigation.

While the discussion in the present invention is directed primarily to the use of the system for irrigation purposes, it has been found that the system works equally well in the reverse direction so that it can be used as a drainage system. Here, the capillary action of the fabric sheath permits water to enter the interior of the conduits but filters out the soil salts and particles so that the conduits do not become clogged. The ensuing description will proceed on the basis of the use for irrigation purposes, it being understood that the invention is equally applicable to drainage purposes as well.

It is an object, therefore, of the present invention to provide an improved underground water distribution system.

More particularly, it is an object of the present invention to provide an improved underground irrigation system capable of distributing irrigating liquids underground in controllable amounts and evenly dispersing said liquids within desired areas. It is a specific object and advantage of the present invention that the same may be used without becoming clogged on account of back flow into the conduits of soil salts, soil particles and the like. It is also a specific object of the present invention to provide a sheathed underground irrigation system which is resistant to chemical reactions with soil salts and irrigating chemicals.

Further objects and advantages of the present invention will become apparent upon reading the ensuing detailed description in conjunction with the accompanying drawings.

DESCRIPTION OF THE PREFERRED EMBODIMENT

Figure 1:
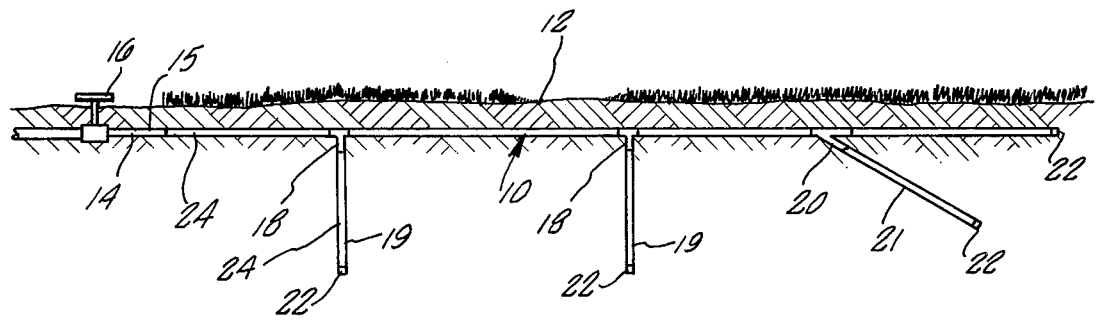
FIG. 1 is a diagrammatic elevation showing a typical conduit system contemplated by the present invention.

FIG. 1 shows a system generally designated 10 buried below soil surface 12 and having an inlet or outlet end 14 controlled as desired by a valve 16. The system of conduits may include any number of T sections 18 or Y sections 20 as desired to provide lateral conduits such as 19 and 21 to cover a desired ground area. All of the unattached ends 22 of these conduits are sealed or closed off thereby providing an essentially closed irrigation system, except as hereinafter described. The conduit 15 itself is covered at intervals by a sheath 24 as will be more fully described hereinafter. It is to be noted from FIG. 1 that the sheath covers various sections of the conduit, but it is not always necessary to cover the entire conduit nor is it necessary to cover the T and Y sections 18 and 20.

Figure 2:
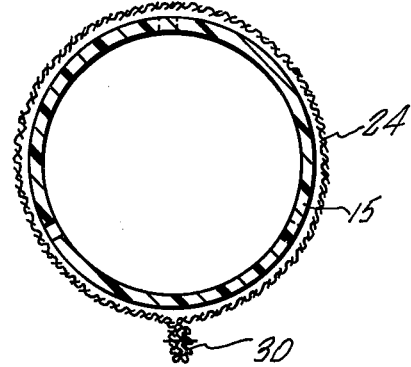
FIG. 2 is a perspective view, partially in section, of a portion of conduit made in accordance with the present invention.
Figure 3:
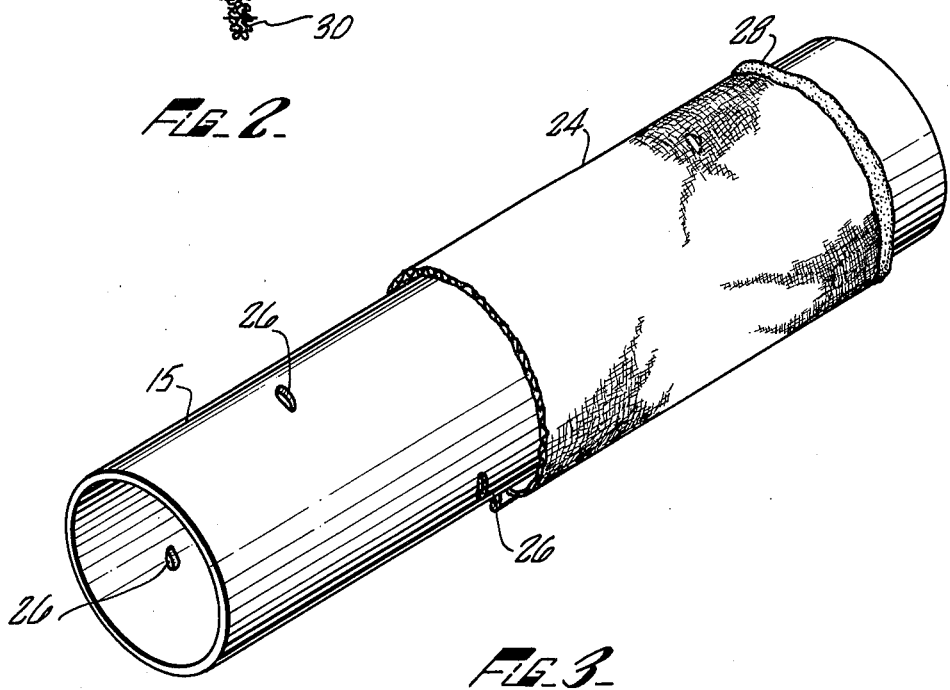
FIG. 3 is a sectional view taken along line 3-3 of FIG. 2.

As shown in FIGS. 2 and 3, conduit 15 is provided with a plurality of apertures 26 which are located at intervals along the length of the conduit and positioned radially about the periphery of the conduit wall at varying radial positions. A fabric sheath 24 is fitted about conduit 15 and extends over that length of conduit in which apertures 26 are provided thereby forming a continuous fluid-receiving annular chamber between the sheath and the conduit. The ends of the sheath 24 may be sealed to the conduit surface by means of an adhesive sealant such as that shown at 28, or by other suitable means for sealing the ends so as to prevent the escape of fluid from the ends of chamber.

The particular type of fabric is considered an important element of the present invention. The fabric from which the sheath 24 is constructed must be of a uniform weave preferably having at least a bi-directional fiber orientation. In addition, the weave must be sufficiently small such that the interstices of the fabric between the fibers are essentially capillary in size. Although the water leaves the conduit only at specific points, it fills slightly the entire chamber between the conduit and the sheath. The water then exceeds through the interstices uniformly over the entire surface area of the sheath appearing much like condensation on the surface.

In the preferred form of the invention, the conduit 15 is constructed from polyvinyl chloride material and the sheath 24 is a Dacron or Acrilan type of fabric. The sheath may be constructed in pre-determined sizes having a tubular configuration, or as an alternative flat stock may be used and the sheath doubled over and sewn as at 30 in FIG. 3.

The flow of irrigating fluid through the sheath is apparently the result of capillary action through the interstices of the fabric. The rate of flow can be varied in a number of ways, including varying the size and location of apertures 26, the diameter of conduit 15 or by varying the input pressure of the irrigating liquid. In addition, the soil chemistry and texture itself will to some extent determine the rate of fluid flow and this can be further varied by laying the conduits in a surrounding medium such as sand.

As an example of the present invention, I have constructed a portion of conduit utilized ½ inch diameter PVC pipe sheathed with Acrilan fabric sewn together using Dacron thread. One-eighth inch apertures were located at three inch intervals stationed around the periphery of the conduit. The conduit was then buried six inches below the soil surface on top of a three inch layer of sand covered by soil mixed with some sand. The length of this conduit was twenty feet. After connecting the conduit to a water source and applying water pressure thereto for a period of time, examination of the soil bed showed that soil moisture was substantially uniform along the entire length of the sheath, not only in the vicinity of the conduit itself but as far as 10 and 20 feet spaced laterally therefrom. It appears that the liquid is not only distributed uniformly along the length of the sheath but that it is also dispersed outwardly uniformly from the conduit. It is obvious that because the water seeps or sweats through the fabric covering, there is no noticeable soil erosion. In addition, by burying the conduit below the soil surface, water loss due to evaporation is substantially reduced. After prolonged usage of the sample product in the ground, it has been found that the conduits are substantially free of build-up due to any backflow of soil particles or as the result of any chemical reactions between soil salts and fluids inside the conduits.

While I have shown and described one particular embodiment of the invention, it would be obvious to those skilled in the art that changes and modifications might be made therein without departing from this invention in its broader aspects. One of the other advantages of the present invention not heretofore mentioned is that the rate of flow of fluid can be adjusted and the fluid heated so as to provide a radiant heating type of irrigation system to help alleviate frost damage for certain citrus crops. The use of the chemically impervious materials for the conduit and the sheath further enable the use of this system for radiant heating purposes without the prospect of increasing the chemical reaction of the system with the soil. What is intended to be covered by the present invention is described within the lawful scope of the appended claims.

I claim:

1. A conduit system particularly adapted for the distribution of fluid below the surface of the ground, comprising:
   a tubular conduit having an open inlet end, said conduit having one or more other ends which are closed, said conduit having a plurality of apertures in the wall thereof located at spaced intervals along the length of said conduit and positioned radially about the periphery thereof;
   a continuous fabric sheath surrounding the exterior of said conduit covering all of said apertures, the ends of said sheath being sealingly affixed to said conduit, said sheath having uniformly distributed interstices in the fabric thereof which are capillary in size.

2. A conduit system particularly adapted for the distribution of fluid below the surface of the ground, comprising:
   a tubular conduit having an open inlet end, said conduit having one or more other ends which are closed, said conduit having a plurality of apertures in the wall thereof located at spaced intervals along the length of said conduit and positioned radially about the periphery thereof;
   a continuous fabric sheath surrounding the exterior of said conduit covering all of said apertures, said sheath defining a continuous fluid-receiving annular chamber, the ends of said sheath being sealingly affixed to said conduit closing the ends of the chamber defined thereby, said sheath having uniformly distributed interstices in the fabric thereof which are capillary in size.

3. A conduit system particularly adapted for the distribution of fluid below the surface of the ground, comprising:
   a conduit composed of material which is chemically inert with respect to irrigating fluids and soil constituents, said conduit having an open inlet end, the other end of said conduit being closed, said conduit having a plurality of apertures located at spaced intervals along the length of said conduit and positioned radially about the periphery thereof;
   a continuous fabric sheath surrounding the exterior surface of said conduit covering all of said apertures, the ends of said sheath being sealingly affixed to said conduit, the fabric of said sheath having the fibers thereof woven uniformly, the fibers of said fabric being tightly woven providing interstices of capillary size, said fabric being composed of material which is chemically inert with respect to irrigating fluids and soil constituents.

* * * * *